United States Patent [19]
Lee et al.

[11] Patent Number: 5,808,453
[45] Date of Patent: Sep. 15, 1998

[54] SYNCHRONOUS CURRENT SHARING PULSE WIDTH MODULATOR

[75] Inventors: Chae Lee, Campbell; Trang Minh Nguyen, Fremont; Robert Blattner, Castro Valley, all of Calif.

[73] Assignee: Siliconix incorporated, Santa Clara, Calif.

[21] Appl. No.: 701,114

[22] Filed: Aug. 21, 1996

[51] Int. Cl.[6] .................................................... G05F 1/613
[52] U.S. Cl. .......................................... 323/224; 323/272
[58] Field of Search .................................... 323/224, 225, 323/272, 282, 283, 284, 285; 363/65, 71, 72

[56] References Cited

U.S. PATENT DOCUMENTS

| | | | |
|---|---|---|---|
| 4,238,796 | 12/1980 | Mawhinney | 343/17.1 R |
| 4,241,345 | 12/1980 | Johnson | 343/7 PL |
| 4,694,388 | 9/1987 | Losel | 363/72 |
| 4,814,965 | 3/1989 | Peterson | 363/65 |
| 4,924,170 | 5/1990 | Henze | 363/71 |
| 4,984,241 | 1/1991 | Truong | 371/36 |
| 5,052,028 | 9/1991 | Zwack | 331/49 |
| 5,122,726 | 6/1992 | Brent et al. | 323/272 |
| 5,191,519 | 3/1993 | Kawakami | 363/71 |
| 5,357,417 | 10/1994 | Desvaux | 363/71 |
| 5,371,764 | 12/1994 | Gillingham et al. | 307/65 |
| 5,434,770 | 7/1995 | Dreifuerst et al. | 363/65 |
| 5,495,233 | 2/1996 | Kawashima et al. | 370/105.1 |
| 5,570,397 | 10/1996 | Kubista | 327/144 |
| 5,572,554 | 11/1996 | Heflin | 375/356 |
| 5,592,126 | 1/1997 | Boudewijns et al. | 331/45 |
| 5,638,264 | 6/1997 | Hayashi et al. | 363/65 |

FOREIGN PATENT DOCUMENTS 0 503 806 A   9/1992   European Pat. Off. .

*Primary Examiner*—Peter W. Wong
*Assistant Examiner*—Derek J. Jardieu
*Attorney, Agent, or Firm*—Skjerven, Morrill, MacPherson, Franklin & Friel; Brian D. Ogonowsky; Daniel P. Stewart

[57] ABSTRACT

Multiple controllers connected in parallel to control external circuits such as dc-dc converters so that the external circuits supply power equally to a load such as a microprocessor. All of the controllers are connected and each controller includes an oscillator and a pulse width modulation circuit to synchronize the frequency of all of the oscillators such that the duty cycle of all the oscillators are equal. Each controller includes an over-current protection circuit and an over-voltage protection circuit which will cause the controller with a fault to discontinue supplying power to the load. Each controller further includes a circuit to adjust the duty cycle of the non-faulty controllers when a controller with a fault is caused to discontinue supplying power to the load.

24 Claims, 6 Drawing Sheets

SYNCHRONOUS CURRENT SHARING PULSE WIDTH MODULATOR

BACKGROUND OF THE INVENTION

1. Field of the Invention

This invention relates generally to multiple controllers connected in parallel with synchronous current sharing pulse width modulators in each controller and, more specifically, to multiple controllers connected in parallel with synchronous current sharing pulse width modulators in each controller that provide true current sharing for multiple redundant power supplies and, even more specifically, to multiple controllers with synchronous current sharing pulse width modulators in each controller that force current sharing by synchronizing the duty cycles of all parallel controllers.

2. Discussion of the Related Art

Prior attempts to achieve current sharing by multiple power supplies provided devices that controlled the output current from each power supply through a load switch on each power supply. A simple microprocessor was needed to monitor and adjust the biasing level of all the parallel load switches. The microprocessor adjusted the biasing level of the parallel load switches depending upon the status of each power supply output current. In the prior art devices, the current sharing was adjusted after the current had been produced by each power supply and the adjustment and control required complicated control circuits in addition to the microprocessor.

What is needed is a simple device to provide true current sharing for multiple redundant power supplies in which the current sharing occurs at the source of control, instead of trying to adjust the current after it has been produced.

SUMMARY OF THE INVENTION

The present invention is directed to multiple controllers connected in parallel to control circuits such as dc-dc converters such that the circuits supply power equally to a load such as a microprocessor. All of the controllers are connected and each controller includes an oscillator and a pulse width modulation circuit to synchronize the frequency of all of the oscillators such that the duty cycle of all the oscillators are equal.

A synchronization line connecting the oscillators in all the controllers causes each oscillator to operate at the same frequency.

All of the controllers have over-current protection circuits.

All of the controllers have over-voltage protection circuits.

Each oscillator in each controller has associated with it a timing capacitor and the synchronization line causes each timing capacitor to discharge at the same time.

Each oscillator in each controller has associated with it a resistor that with the timing capacitor determines a time constant for each oscillator. The resistors and timing capacitors are chosen to make the time constant for each oscillator substantially equal.

The over-current protection circuit in each controller will cause the associated external circuit to discontinue supplying a load with power if there is determined that an over-current condition exists within that external circuit.

The over-voltage protection circuit in each controller will cause the associated external circuit to discontinue supplying a load with power if there is determined that an over-voltage situation exists in the power being supplied to the load.

The present invention is better understood upon consideration of the detailed description below, in conjunction with the accompanying drawings. As will become readily apparent to those skilled in this art from the following description there is shown and described an embodiment of this invention simply by way of illustration of the best mode to carry out the invention. As will be realized, the invention is capable of other embodiments and its several details are capable of modifications in various obvious aspects, all without departing from the scope of the invention. Accordingly, the drawings and detailed description will be regarded as illustrative in nature and not as restrictive.

BRIEF DESCRIPTION OF THE DRAWINGS

The accompanying drawings incorporated in and forming a part of the specification, illustrate the present invention, and together with the detailed description below serve to explain the principles of the invention. In the drawings.

DETAILED DESCRIPTION

Figure 1:
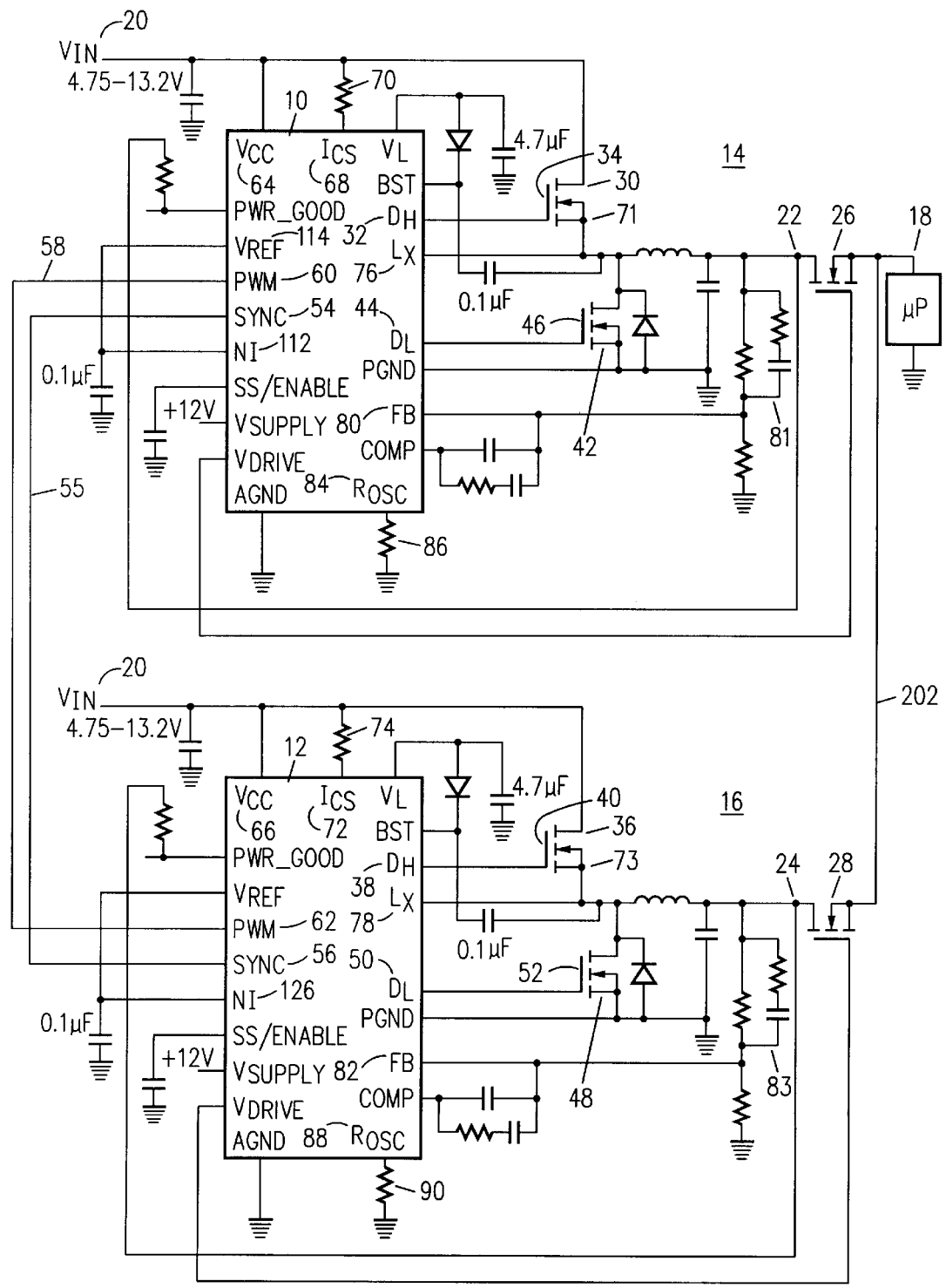
FIG. 1 shows two controllers of the present invention, one disposed in a first circuit and a second disposed in a second circuit wherein the first and second circuits are connected and provide power to a microprocessor which is the load.

In the following description, for purposes of clarity and conciseness of the description, not all of the numerous components shown in the schematics are described or described in detail. The numerous components are shown in the drawings to provide a person of ordinary skill in the art a thorough enabling disclosure of the present invention. It will be apparent to one skilled in the art that a detailed description of all of the specific components is not required in order for one of ordinary skill in the art to practice the present invention. Therefore, only those components that are affected by the present invention or that are necessary for an understanding of the operation of the present invention will be discussed. In addition, well known electrical structures and circuits are also shown in block diagram form in order to not obscure the present invention unnecessarily.

Referring now to FIG. 1 there is an illustrative application with a first controller 10 and a second controller 12. It is to be understood that the application to be described is for illustrative purposes only and that other applications are to be considered within the expertise of one of ordinary skill in the art after reading the following detailed description of the present invention and therefore, are considered to be within the scope of the present invention.

The illustrative application shown in FIG. 1 consists of a first dc-dc converter 14 and a second dc-dc converter 16. The first and second dc-dc converters, 14 and 16, share in supplying power to a load, in this case the load is the microprocessor 18. The first and second dc-dc converters 14 and 16 have a common power supply, $V_{IN}$, indicated at 20. The output of the first dc-dc converter 14 is at the node 22, and the output of the second dc-dc converter 16 is at the node 24. The MOSFET 26 and the MOSFET 28 act as switches to switch power from being supplied to the microprocessor 18 from a dc-dc converter in case of a catastrophic failure of that dc-dc converter which would damage the microprocessor 18.

The controller 10 is integrally connected to the dc-dc converter 14 and the controller 12 is integrally connected to the dc-dc converter 16. The controller 10 and the controller 12 are connected in parallel and cooperate to control certain operations (to be described in more detail below) of the dc-dc converters 14 and 16. One of the operations controlled is to have each dc-dc converter share equally in supplying power to the microprocessor 18 and to automatically adjust the power output from each dc-dc converter if one of the controllers senses a fault in the associated dc-dc converter. Another operation controlled by the controllers is the sensing of an over-current or an over-voltage condition in the power being supplied to the microprocessor 18.

The controller 10 controls the highside MOSFET 30 with a connection from the $D_H$ pin 32 to the gate 34 of the MOSFET 30. The controller 12 controls the highside MOSFET 36 with a connection from the $D_H$ pin 38 to the gate 40 of the MOSFET 36. The controller 10 controls the lowside MOSFET 42 with a connection from the $D_L$ pin 44 to the gate 46 of the MOSFET 42. The controller 12 controls the lowside MOSFET 48 with a connection from the $D_L$ pin 50 to the gate 52 of the MOSFET 48. The controller 10 is connected to the controller 12 via the synchronization line 55 connected to the controller 10 at the synchronization pin 54 and which is connected to the controller 12 at the synchronization pin 56. The controller 10 is also connected to the controller 12 via the pulse width modulation (PWM) line 58 connected to the controller 10 at the pulse width modulation pin 60 and which is connected to the controller 12 at the pulse width modulation pin 62. The $V_{CC}$ pin 64 on the controller 10 is connected to the power supply 20 and the $V_{CC}$ pin 66 on the controller 12 is connected to the power supply 20. The $I_{CS}$ pin 68 on the controller 10 is connected to the power supply $V_{IN}$ 20 via the resister 70 that is selected to provide a selected voltage drop at the $I_{CS}$ pin 68. The $I_{CS}$ pin 72 on the controller 12 is connected to the power supply $V_{IN}$ 20 via the resistor 74 that is selected to provide a selected voltage drop at the $I_{CS}$ pin 72. The resistor 70 and the resistor 74 are typically selected so as to provide the same voltage at the $I_{CS}$ pin 68 on the controller 10 and at the $I_{CS}$ pin 72 on the controller 12. The $L_X$ pin 76 on the controller 10 is connected to the source 71 of the highside MOSFET 30 and the $L_X$ pin 78 on the controller 12 is connected to the source 73 of the highside MOSFET 36. The feedback (FB) pin 80 on the controller 10 is connected to the output node 22 of the dc-dc converter 14 through a divider network 81 and the feedback (FB) pin 82 on the controller 12 is connected to the output node 24 of the dc-dc converter 16 through a divider network 83. The $R_{OSC}$ pin 84 on the controller 10 is connected to ground via the resistor 86 and the $R_{OSC}$ pin 88 on the controller 12 is connected to ground via the resistor 90. Typically, the resistor 86 and the resistor 90 are substantially identical and are selected to cooperate with reactive components, typically capacitors, in oscillators (to be discussed below) in the controllers 10 and 12 to produce a desired oscillator waveform with a desired amplitude and duty cycle. Ideally, the waveforms produced by the oscillator in the controller 10 and by the oscillator in the controller 12 are equal. However, as can be appreciated by those skilled in the art, process variations during manufacturing can be the cause of differences in component parameters that preclude such parameters from being exactly equal. The matching of resistors with timing capacitors in oscillators to obtain the desired waveform is well known in the art and will not be discussed here.

Figure 2A:
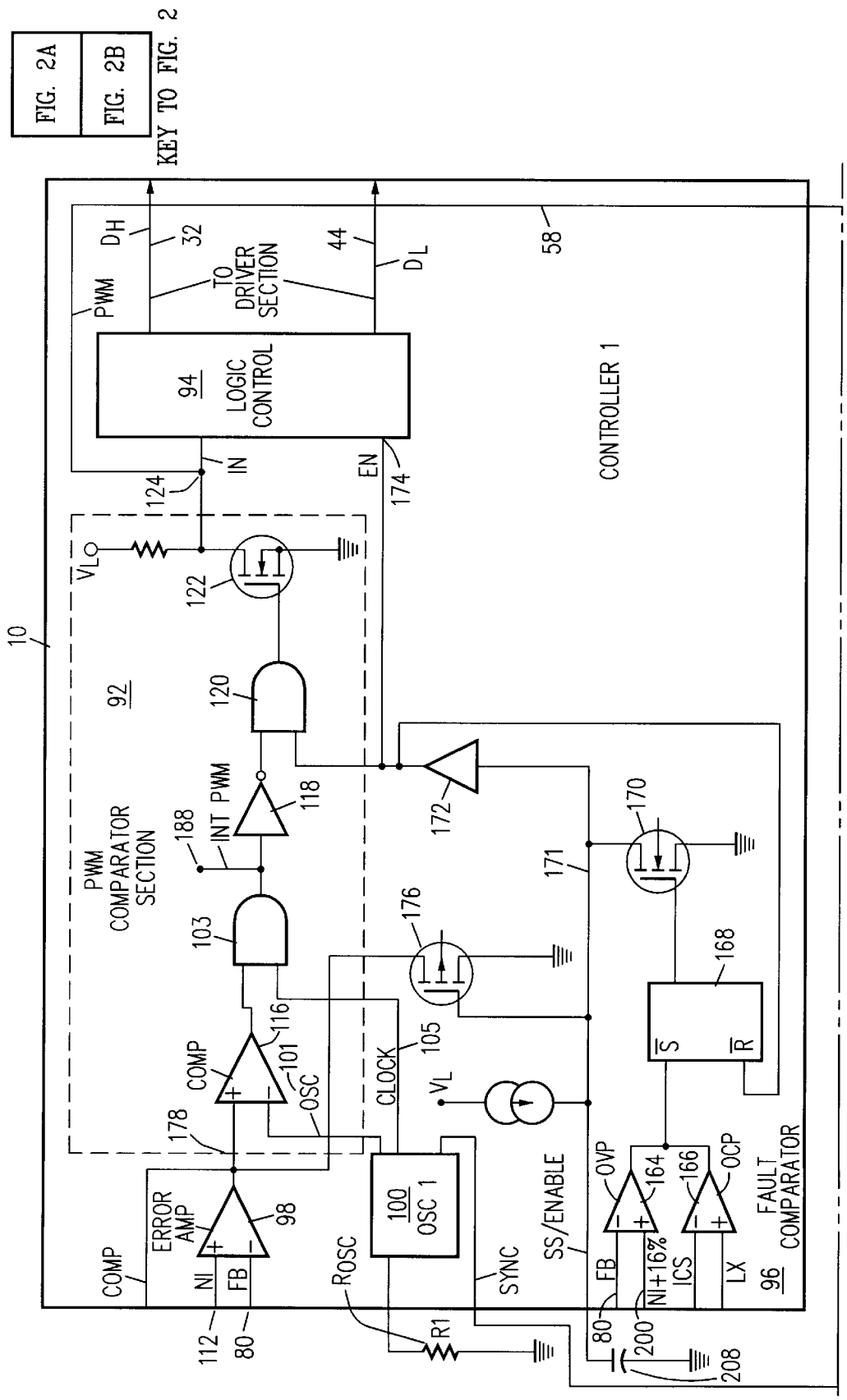
FIG. 2 is a schematic of each of the controllers shown in FIG. 1 showing the connections between the two controllers and the connections between the controllers and the first and second circuits.
Figure 2B:
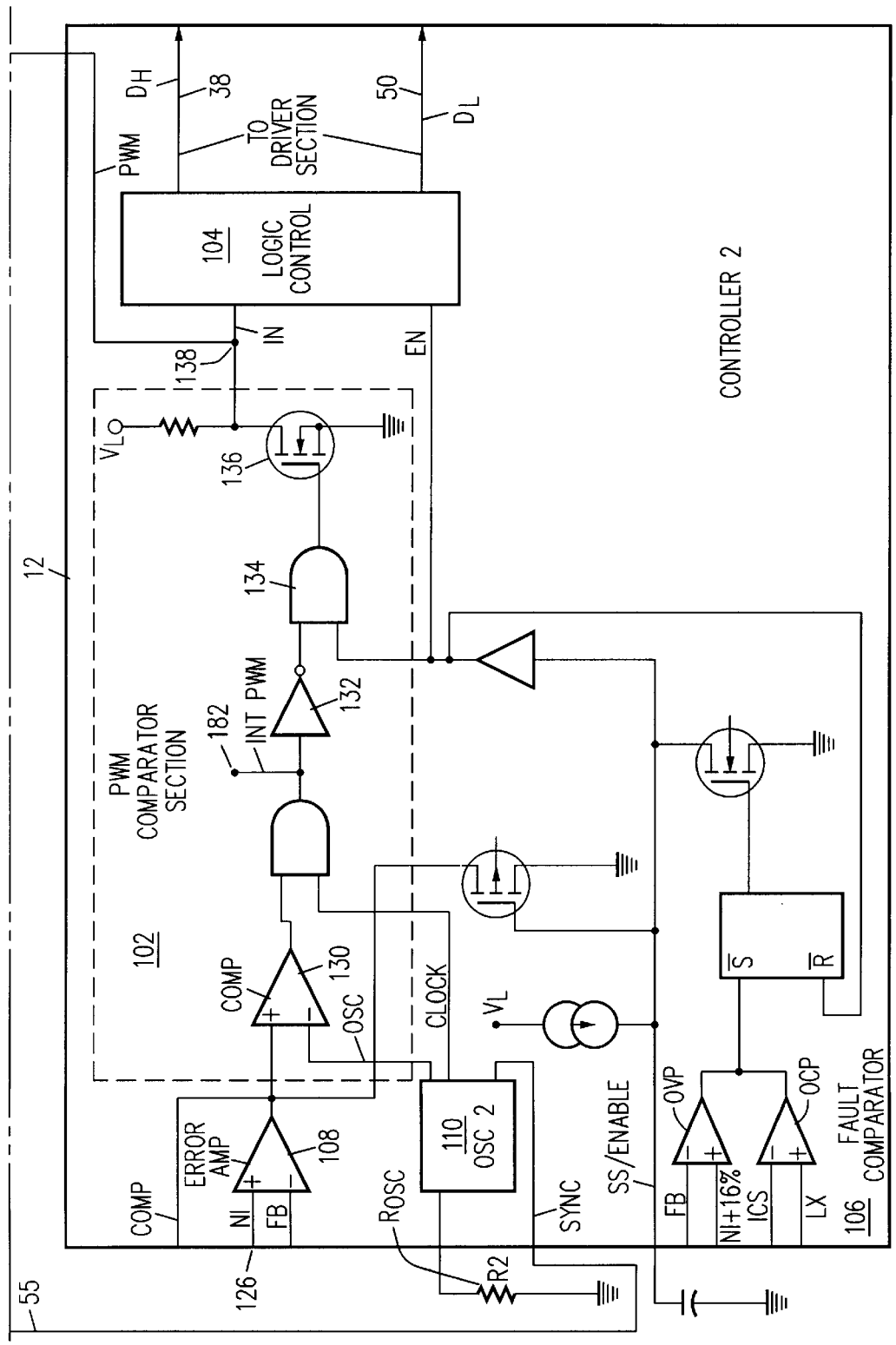

Referring now to FIG. 2 there is shown the controller 10 and the controller 12 in block diagram form. It is noted that like numerals are used to indicate like elements between FIG. 2 and FIG. 1. The controller 10 and the controller 12 are designed to be substantially identical and ideally would provide exactly the same control functions to external circuits. In some of the following discussion, the operation of the controller 10 will be described with the understanding that the controller 12 is designed to operate in the same way. It is to be understood that any differences in the operation, unless specifically pointed out, are due to manufacturing differences. In addition, the operation of the two controllers will be described when the operation of one affects the operation of the other. It is also to be understood that the present invention comprehends more than two controllers in parallel to control additional external circuits, such as the dc-dc converters described above. Such additional controllers would be connected in parallel to the two controllers described herein. Each additional controller would be substantially identical to the controllers 10 and 12 and would also be connected via the synchronization line 55 and the pulse width modulation line 58 in the same way controllers 10 and 12 are connected.

Referring again to FIG. 2 the controller 10 is made up of three basic sections, the pulse width modulator comparator section 92, the logic control section 94, and the fault comparator section 96. Also included in the controller 10 is the error amplifier 98, the oscillator 100, and other components that will be described below. Similarly, the controller 12 is made up of the pulse width modulator comparator section 102, the logic control section 104, and the fault comparator section 106. Also included in the controller 12 is the error amplifier 108, the oscillator 110, and other components that will be described below.

The first function that will be described is the synchronized duty cycle control function and will be described in conjunction with FIGS. 2 and 3. The synchronization line 55 connects the oscillator 100 in the controller 10 to the oscillator 110 in the controller 12 for the purpose of synchronizing the duty cycles of the oscillators in the two controllers. This is accomplished as follows. In each of the controllers, as described above, there is an error amplifier. The error amplifier 98 in the controller 10 compares a signal designated NI which appears at the NI (noninverting) pin 112 which is also connected to the $V_{REF}$ pin 114 (FIG. 1). The NI signal 112 is input to the noninverting input of the error amplifier 98 where it is compared to the feedback signal FB at pin 80 (FIG. 1) of the controller 10. The output of the error amplifier 98 is input to the positive input of the comparator 116 in the pulse width modulation comparator section 92 where it is compared to the instantaneous amplitude of the oscillator 100 waveform, indicated at 101, which is input to the negative input of the comparator 116. The output of the comparator 116 is input to the AND gate 103 where it is ANDed with a clock input, indicated at 105, from the oscillator 100. The output of the AND gate 103 is inverted by the invertor 118. The output of the invertor 118 is input to the AND gate 120. The output of the AND gate 120 is connected to the gate of the MOSFET 122 which is an n-channel enhancement type MOSFET. If the NI signal 112 is greater than the FB 80 signal the output of the error amplifier 98 will increase. As long as the output of the error amplifier 98 is greater than the instantaneous amplitude of the waveform from the oscillator 100, the output of the comparator 116 will be positive. As long as the clock input 105 from the oscillator 100 is HIGH the output of the AND gate 103 will be HIGH and the output from the invertor 118 will be LOW and the output of the AND gate 120 will be LOW which will keep the n-channel MOSFET 122 turned OFF which causes the node 124 to be HIGH. A HIGH condition at the node 124 which is input to the logic control 94 and also to the logic control 104 in the controller 12 via the pulse width modulation line 58 will cause the $D_H$ pin 32 to remain HIGH and the $D_L$ pin 44 to remain LOW which will, in turn, cause the highside MOSFET 30 to remain ON and the lowside MOSFET 42 to remain OFF. The purpose of having the node 124 tied to the input of the logic control 104 will be discussed below.

However, if the FB signal 80 to the error amplifier 98 becomes larger than the NI 112 signal to the error amplifier 98 the output of the error amplifier 98 will decrease in amplitude which is input to the comparator 116. If the instantaneous amplitude of the oscillator 100 waveform which is input to the comparator 116 is greater than the input to the comparator 116 from the error amplifier 98 the output of the comparator 116 will switch to LOW. The LOW from comparator 116 is input to the AND gate 103 which will cause the output from the AND gate 103 to be LOW regardless of the other input to the AND gate 103. The LOW from the AND gate 103 will be inverted by the invertor 118 to a HIGH which is input to the AND gate 120. If the other input to the AND gate 120 is in a HIGH condition (indicating that there is not a fault being sensed by the fault comparator section 96 which will be discussed below) the switch to a HIGH condition at the input to the AND gate 120 will cause the n-channel MOSFET 122 to turn ON which will pull the node 124 to a LOW. The LOW at the node 124 is input to the logic control 94 and the LOW is communicated via the pulse width modulation line 58 to the node 138 in the controller 12. The LOW at the node 138 is input to the logic control 104. The logic control 94 in the controller 10 controls the highside MOSFET 30 (FIG. 1) via the $D_H$ pin 32 and the lowside MOSFET 42 (FIG. 1) via the $D_L$ pin 44. The logic control 104 in the controller 12 controls the highside MOSFET 36 (FIG. 1) via the $D_H$ pin 38 and the lowside MOSFET 48 (FIG. 1) via the $D_L$ pin 50. Thus, when either the MOSFET 122 or the MOSFET 136 is ON the inputs to the logic control 94 and the logic control 104 are both LOW. This LOW causes the highside MOSFETs 30 and 36 in controllers 10 and 12 respectively, to be OFF. In addition, the LOW causes the lowside MOSFETs 42 and 48 in controllers 10 and 12 respectively, to be ON.

In order to provide current sharing of power supplies the highside MOSFETs 30 and 36 must both be turned ON and OFF at the same time and the lowside MOSFETs 42 and 48 must both be turned ON and OFF at the same time. For these MOSFETs to be synchronized ON and OFF, the logic control sections 94 and 104 must have the same input at nodes 124 and 138, respectively. For the node 124 to be HIGH (only the requirements for the node 124 will be discussed-it is to be understood that the requirements for the node 138 would be exactly the same) the MOSFET 122 must be OFF. For the MOSFET 122 to be OFF either input (or both) to the AND gate 120 must be LOW. The input to the AND gate 120 from the fault comparator section 96 will be assumed to be HIGH for the purposes of this discussion (indicating that there is no fault being sensed by the fault comparator section 96). The fault comparator section 96 will be discussed below. Thus, for the remaining input to the AND gate 120 to be LOW, the input to the invertor 118 must be HIGH which, in turn, means that both inputs to the AND gate 103 must be HIGH. For this HIGH to occur, the output of the comparator 116 must be HIGH and the clock input 105 from the oscillator 100 must be HIGH. For the output of the comparator 116 to be HIGH the NI input 112 to the error amplifier 98 must be greater than the FB input 80 to the error amplifier 98.

Figure 3:
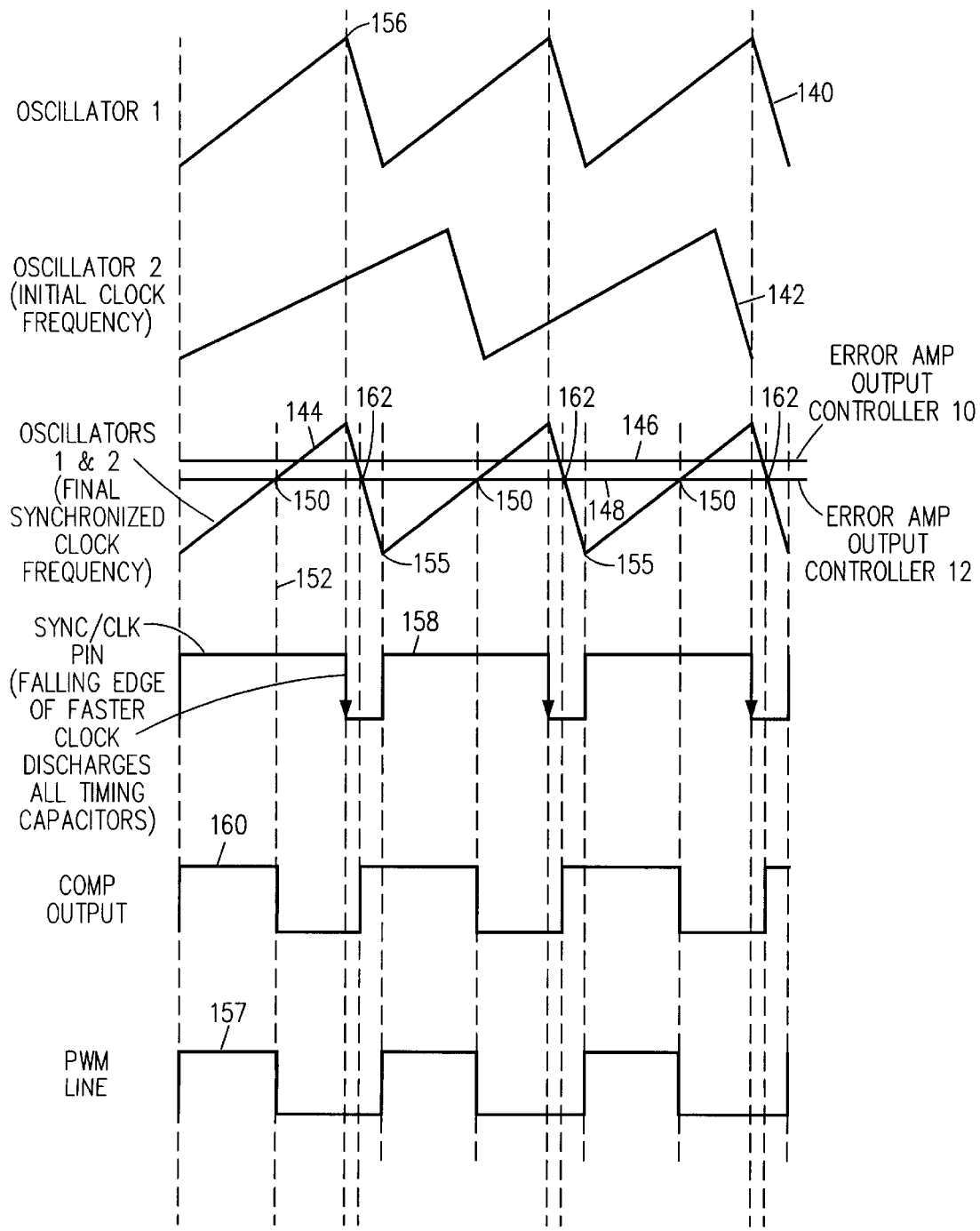
FIG. 3 is a synchronized duty cycle control timing diagram showing waveforms from the first and second controllers.

Referring now to the waveforms in FIG. 3, in conjunction with FIG. 2, it can be seen what will cause either of the MOSFETs 122 or 136 to be turned OFF and then turned back ON as discussed above. In FIG. 3 there is shown the instantaneous amplitude of the waveform output 140 by the oscillator 100. For purposes of this discussion, it is assumed that the oscillator 100 outputs a higher frequency waveform and that the output from the error amplifier 108 in the controller 12 is less than the output magnitude from the error amplifier 98 in the controller 10. It is to be understood that these selections are arbitrary. The instantaneous amplitude of the waveform of the oscillator 110, is shown at 142. The waveform of the oscillator 110 is shown to have an initial frequency lower than the frequency of the oscillator 100. The connections between the controller 10 and the controller 12 cause the waveforms to be the same and the final synchronized clock frequency waveform is shown at 144. Also shown with the waveform 144 are the output 146 from the error amplifier 98 in the controller 10 and the output 148 from the error amplifier 108 in the controller 12. As discussed above, when the output from either of the comparators 116 or 130 in the pulse width modulation comparator section 92 in controller 10 or the pulse width modulator comparator section 102 in controller 12 respectively, goes LOW, the respective MOSFET turns ON pulling both of the nodes 124 and 138 to LOW and which are the inputs to the logic control sections 94 and 104, respectively. The output of either of the comparators 116 or 130 will go LOW when the instantaneous amplitude of the waveform from oscillator 100 or 110, respectively, is greater than the input from error amplifier 98 or 108, respectively. Referring to the waveform 144 and the associated error amplifier outputs, 146 and 148 (FIG. 3), it can be seen that the amplitude of the final synchronized clock frequency 144, which is the instantaneous amplitude of the oscillators and which is the negative input to the comparators 116 and 130, will first become larger than the amplitude of the lower of the two outputs 146 and 148 of the error amplifiers 98 and 108, respectively. In this case, the output 148 from the error amplifier 108 in the controller 12 is shown to be the lower of the two. This event is indicated at the intersections 150 which are the intersections of the final synchronized clock frequency 144 and the output 148 of the error amplifier 108. The dashed line 152 indicates that this event causes the pulse width modulation pin waveform 157 to go LOW.

Continuing the analysis of FIG. 3 the oscillator waveforms 140 and 142 are caused to be synchronized as follows. Referring to the waveform 140, it begins to fall at the point 156 which is determined by the relative size of the timing capacitor in the oscillator 100 and the resistor 86 connected to $R_{OSC}$ 84 in controller 10. This falling edge is communicated to the oscillator 110 in the controller 12 by the synchronization line 55. This connection causes the timing capacitor in the oscillator 110 in the controller 12 to discharge and thus the oscillator waveforms will be forced into synchronization as shown by the waveform 144. The oscillator waveform will begin to rise at 155 also determined by the relative size of the timing capacitors in the oscillators 100 and 110 in the controllers 10 and 12, respectively. As discussed above, the timing capacitors and associated resistors are chosen so that the waveforms are substantially equal such that the points 155 at which the oscillator waveforms begin to rise will be substantially the same for all the oscillators in all the controllers. The waveform 142 will not exist but is shown to indicate what it would be if there was no synchronization. The waveform 158 is the waveform that appears on the synchronization line 55 and the clock line 105 from the oscillator 100 in the controller 10. The waveform 160 is the waveform that appears at the output of the comparator 116 and shows the output of the comparator 116 going LOW when the waveform 144 crosses the error amplifier output 148 waveform at the intersections 150. The comparator output waveform 160 goes HIGH when the waveform 144 becomes less than the error amplifier output 148 shown at intersections 162. The pulse width modulation pin waveform 157 remains LOW until the synchronization/ clock waveform 158 goes HIGH (this is one of the inputs to AND gate 103 (FIG. 2) and both inputs to the AND gate 103 must be HIGH for MOSFET 122 to be OFF which allows the node 124 to go HIGH and thus the pulse width modulation pin 58 (FIG. 1) and the waveform 157 to go HIGH.

Referring again to FIG. 2 the function of the fault comparator section 96 of the controller 10 will now be discussed. Only the fault comparator section 96 in the controller 10 will be discussed and it is to be understood that the fault comparator section 106 in the controller 12 functions in exactly the same way. The fault comparator section 96 includes the over-voltage protection (ovp) comparator 164, the over-current protection (ocp) comparator 166, and the latch 168 with an output to the gate of the MOSFET 170. The MOSFET 170 is connected to the buffer 172 which has an output that is input to the AND gate 120. The output of the buffer 172 is input to an ENABLE pin (EN) 174 to the logic control 94 and is also input to the R-bar input to the latch 168.

The over-current protection comparator 166 compares the voltage at the $I_{CS}$ pin 68, which is derived from the input voltage $V_{IN}$ 20 via the resistor 70, with the voltage at the $L_X$ pin 76, which is connected to the source 71 of MOSFET 30. When the voltage as measured by the $I_{CS}$ pin 68 becomes larger than the voltage at the $L_X$ pin 76, the output of comparator 166 goes LOW which causes the output of latch 168 to go HIGH which turns the MOSFET 170 ON. This pulls the node 171 LOW. The LOW at the node 171 is communicated to the ENABLE pin 174 on the logic control section 94 which disables the $D_H$ 32 and the $D_L$ 44 outputs which will turn the MOSFETs 30 and 42 OFF and thus, the power to the microprocessor 18 from dc-dc converter 14 will be turned OFF.

The LOW at the node 171 is also communicated to an input of the AND gate 120. As discussed above, any LOW at the AND gate 120 will turn OFF, or maintain an OFF condition of the MOSFET 122. The purpose of maintaining the MOSFET 122 in an OFF condition is to ensure that the over-current fault in one of the power supplies does not affect the power provided to the microprocessor 18 by turning off the other power supplies. This is accomplished, for example, by keeping the node 124 HIGH, if the over-current fault is in dc-dc converter 14, and communicating the HIGH to the node 138 of the controller 12 which will maintain power being supplied to the microprocessor 18 by the dc-dc converter 16.

Figure 4A:
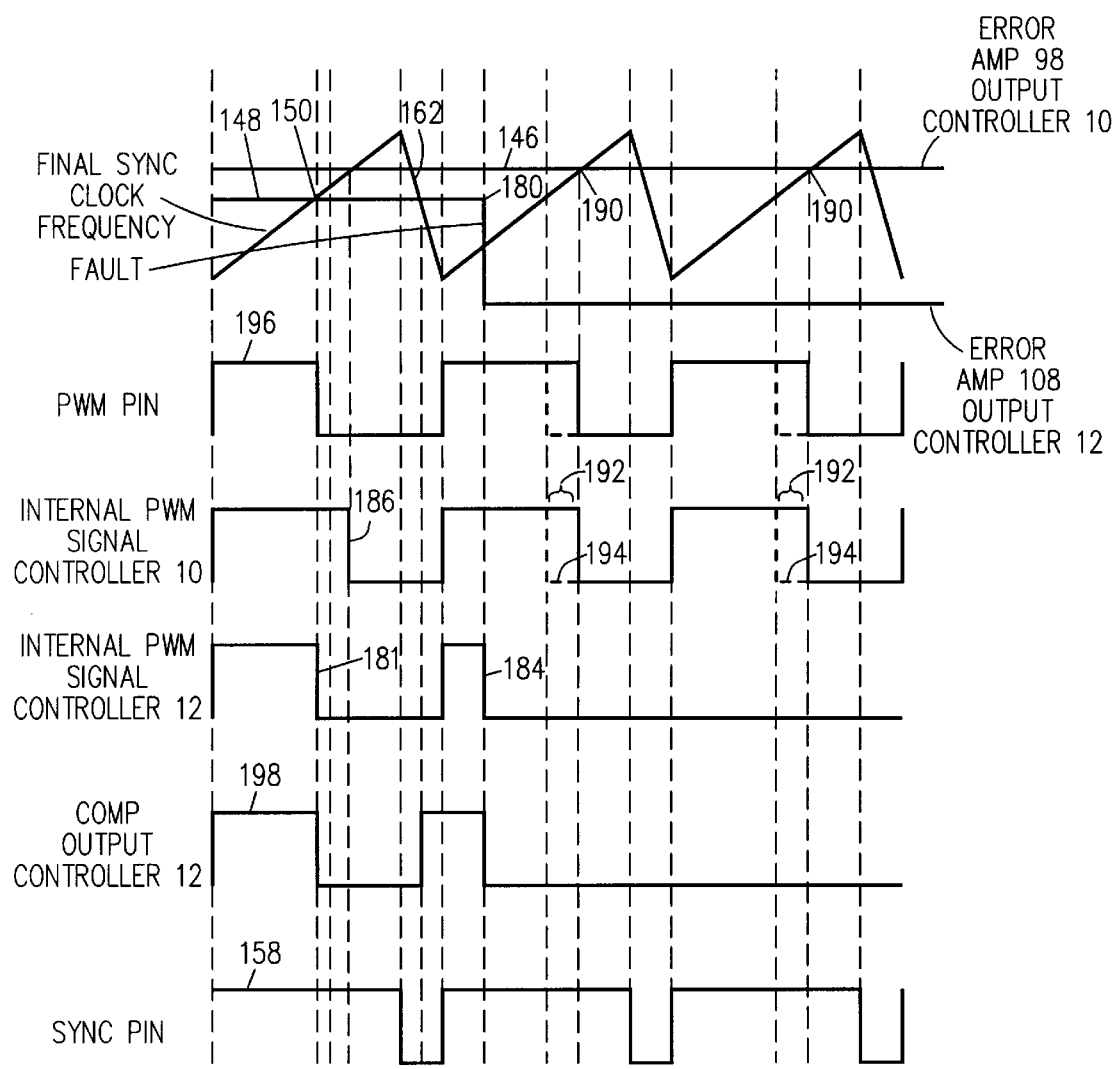
FIG. 4A shows the timing waveforms occurring during an over-current fault.

The LOW at the node 171 is also communicated to the gate of the p-channel MOSFET 176 which turns ON and pulls the node 178 LOW which is connected to the output of the error amplifier 98. The effects of an overcurrent fault can most clearly be seen by referring to FIG. 4A where there is shown the over-current fault timing diagrams which illustrate the waveforms at various locations within the controllers 10 and 12. Like reference numerals are used for like waveforms in FIG. 4A as are used in FIG. 3. In FIG. 4A there are shown the effects of an over-current fault that is detected in the controller 12. The waveform 148 is the output of the error amplifier 108 in the controller 12 and shows the output being pulled to a LOW or ZERO at 180. The effect on the controller 12 can be seen by examining the waveform 181 at the internal pulse width modulation pin 182 in the pulse width modulation comparator section 102 in the controller 12. The waveform 181 which appears at the internal pulse width modulation pin 182 falls to ZERO at point 184 which is caused by the output of the error amplifier 108 being pulled to ZERO. The waveform 186 which appears at the internal pulse width modulation pin 188 in the pulse width modulation comparator section 92 of the controller 10 indicates the effect on the controller 10 of the fault sensed in controller 12. The instantaneous amplitude of the final synchronized clock frequency 144 is now compared to the error amplifier 98 output voltage of controller 10 which is at the points 190. The waveform 186 at the internal pulse width modulation pin 188 is affected by being HIGH for a longer period of time than before the fault, indicated at 192. In addition, the waveform 186 indicates that the internal pulse width modulation pin 188 is at a LOW for a shorter period of time than before the fault, indicated at 194. The waveform 186 is also the waveform 196 that appears at the nodes 124 and 138 and the pulse width modulation pins 60 and 62 in controllers 10 and 12, respectively, by being communicated by pulse width modulation line 58 after the fault condition. The waveform 198 is the waveform that appears at the output of the comparator of the controller that has sensed the fault and, in this case, the waveform 198 will be the output of the comparator 108 in the controller 12. The added time that the pulse width modulation pin waveform 196 is HIGH and the decreased time that the pulse width modulation pin waveform 196 is LOW shows that the controllers interact to automatically adjust the duty cycle of any remaining controllers to compensate for the fact that one of the controllers has been shut OFF by the sensing of an over-current condition by the respective fault comparator section of the respective controller. The duty cycle will also be adjusted by a shift in the amplitude of the output of the error amplifiers in the controllers that remain functional. The shift in the amplitude of the output of the error amplifiers in the remaining functional controllers is caused by the N1 signal being higher than the N1 amplitude of the controller with the fault condition which will cause the duty cycle of all the remaining oscillators to increase to compensate for the disabled controller as described above.

As mentioned above, the output of the buffer 172 is input to the R-bar input to latch 168. For the purposes of the above discussion and for the purposes of this discussion, it is assumed that the over-current fault was sensed in the controller 10. The input to the R-bar input to latch 168 resets latch 168 which would make the output of latch 168 go LOW after a short time once a fault has been detected. This allows the soft start capacitor 208 to charge and enable the controller 10. If the fault condition is still present the latch 168 immediately sets and outputs a HIGH indicating that the fault is still present and the operation of the circuit as described above repeats. A LOW output from latch 168 would turn the MOSFET 170 OFF and normal operation of the controller 10 would resume. The reset/set of latch 168 would be continuous as long as the over-current fault condition exists. This operation is to ensure that (1) a fault does not maintain the OFF condition of the respective controller after the fault ceases to exist and (2) to ensure that the respective controller resumes normal operation as soon as possible after the fault condition is no longer present.

Figure 4B:
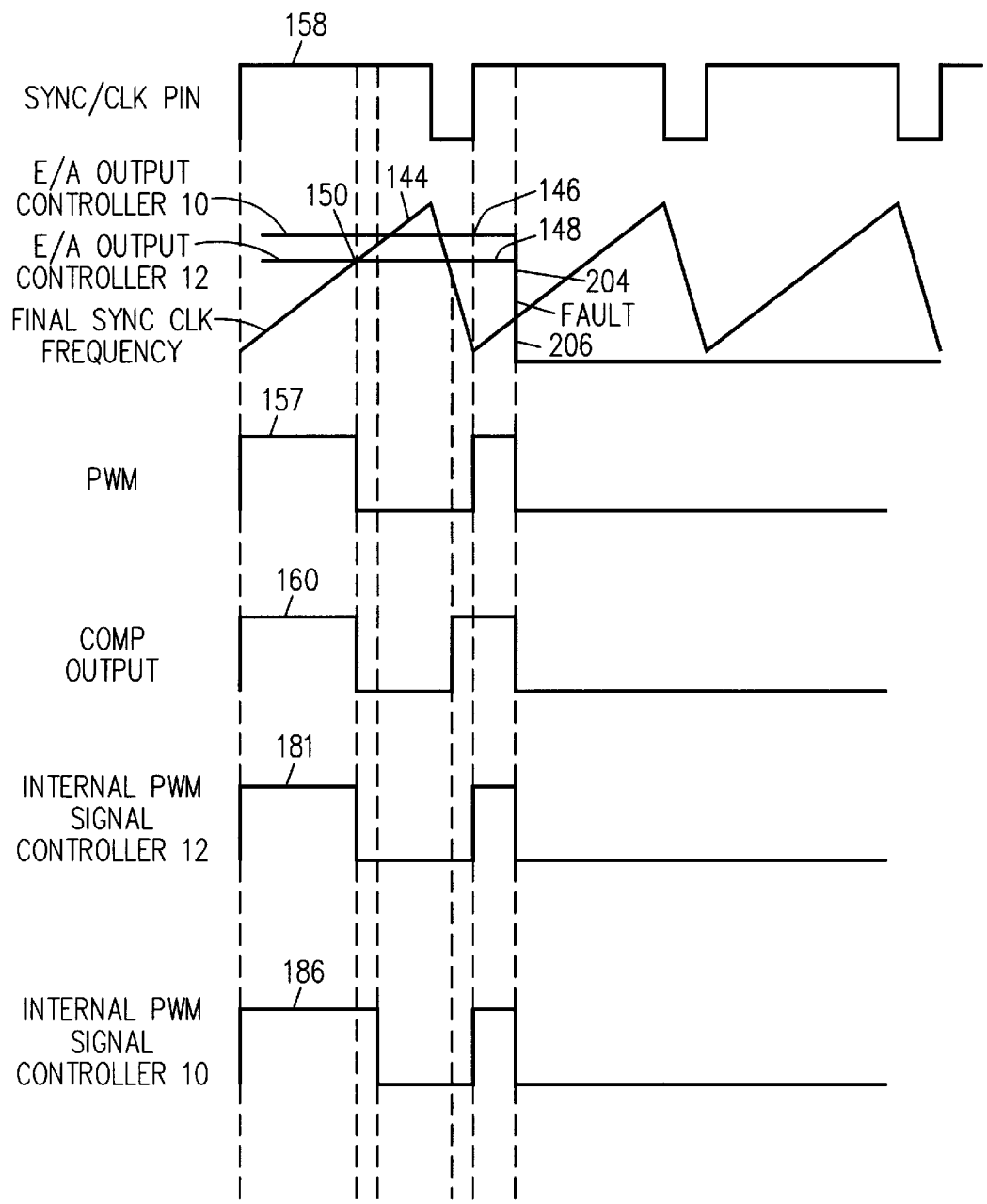
FIG. 4B shows the timing waveforms occurring during an over-voltage fault.

Referring now to FIGS. 2 and 4B the operation of the controllers 10 and 12 when an over-voltage fault has been sensed will be described. An over-voltage condition is sensed by the over-voltage protection comparator 164 in the fault comparator 96 of controller 10. As explained above, the operation of the controllers in an over-voltage condition will be described in relation to controller 10 with the understanding that the operation of controller 12 is exactly the same.

The over-voltage protection comparator 164 compares the feedback FB signal 80 input to the negative input to the comparator 164 with a signal that is the combination of the NI signal 112 plus an arbitrary percentage increase that is input to the positive input to the comparator 164. In this case, the arbitrary percentage increase is 16%. The percentage increase could be called for, for example, by the manufacturer of the microprocessor 18 that is being supplied with power. If the feedback signal FB 80 signal becomes larger than the combination signal, indicated at 200, the output of the comparator 164 goes LOW and latch 168 goes HIGH turning on MOSFET 170. From this point the operation of the fault comparator section is the same as described above with respect to the reaction to the sensing of an over-current condition, with the following exceptions. In the over-current condition the values being compared to sense the over-current condition were values obtained from the respective controller and dc-dc converter. These values were not shared with the other controller or dc-dc converter. In the case of the over-voltage condition, the value indicating an overvoltage is obtained from the output of the respective dc-dc converter, and in the case of dc-dc converter 14, the value is obtained from the node 22 (FIG. 1) and in the case of dc-dc converter 16, the value is obtained from the node 24. The voltage at the node 22 is communicated to the node 24 in dc-dc converter 16 by the connection, indicated at 202 and vice versa. Thus, if there is an over-voltage condition, the over-voltage condition will be sensed by the over-voltage comparators in all connected controllers at the same time assuming the MOSFETs 26 and 28 are ON. The turning ON of the MOSFET 170 in controller 10 and equivalent MOSFETs in other controllers will disable all logic control sections, such as the logic control section 94 in controller 10 and the logic control section 104 in controller 12.

Referring now to the waveforms shown in FIG. 4B in conjunction with FIG. 2 the operation of the over-voltage protection circuit can be better explained. Like numerals are used for like waveforms shown in previous figures. Upon the sensing of an over-voltage condition, and as described above, the over-voltage condition will be sensed by all of the over-voltage protection comparators in all of the attached controllers. The fault will be sensed at the same time, indicated at 204. In the same way as described above in the case of the over-current condition, the MOSFET 170 and equivalent MOSFETs in other controllers will pull down the output of each respective error amplifier. This situation is shown at 206 where the output 146 of the error amplifier in controller 10 is pulled to ZERO as well as the output 148 of the error amplifier in controller 12. The signal at the internal pulse width modulation pin 188 in controller 10 is shown at 186, the signal at the internal pulse width modulation pin 182 in controller 12 is shown at 181. The waveform on the pulse width modulation line is shown at 157. The comparator output shown at 160 is the output of comparator 108 in controller 12, however, the comparator output of equivalent comparators in other controllers would be similar.

As described above, each latch, such as latch 168, will be immediately reset by the input from the output of buffer 172 in controller 10 and equivalent buffers in other controllers. As long as the over-voltage fault condition exists, each latch equivalent to latch 168 will set and shut down the power supply. However, as soon as the over-voltage fault condition ceases, the latches will not set and the controllers will allow operation of the power supplies to resume.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What we claim is:

1. A first controller and at least a second controller wherein the clock rates of the first controller and the at least a second controller are synchronized, comprising:

a first oscillator in the first controller operating at a first frequency;

a second oscillator in at least the second controller operating at a second frequency, wherein the second frequency is substantially equal to the first frequency;

a first timing capacitor coupled to the first oscillator;

a second timing capacitor coupled to the second oscillator; and a synchronization line connecting the first oscillator to the second oscillator causing each oscillator to operate at the same frequency by causing the first and second timing capacitors to discharge at the same time.

2. The first controller and at least a second controller of claim 1, wherein:

the first controller further comprises an over-current protection circuit; and the at least a second controller further comprises an over-current protection circuit.

3. The first controller and at least a second controller of claim 2, wherein:

the first controller further comprises an over-voltage protection circuit; and the second controller further comprises an over-voltage protection circuit.

4. The first controller and at least a second controller of claim 3, wherein:

the first oscillator is associated with a resistor wherein the resistor and the timing capacitor in the first oscillator determine a time constant for the first oscillator; and the second oscillator is associated with a resistor wherein the resistor and timing capacitor in the second oscillator determine a time constant for the second oscillator; and wherein the resistor associated with the first oscillator and the timing capacitor in the first oscillator and the resistor associated with the second oscillator and the timing capacitor in the second oscillator are selected to make the time constant for the first oscillator and the time constant for the second oscillator substantially identical.

5. The first controller and at least a second controller of claim 4, wherein:
- the first controller is connected to a first circuit and controls the first circuit; and
- the second controller is connected to a second circuit and controls the second circuit wherein the first circuit is substantially identical to the second circuit.

6. The first controller and at least a second controller of claim 5, wherein:
- the first circuit includes a highside MOSFET which controls highside power supplied to a load; and
- the second circuit includes a highside MOSFET which controls highside power supplied to the load.

7. The first controller and at least a second controller of claim 6, wherein:
- the over-current protection circuit in the first controller includes a comparator to compare a reference voltage to the voltage at a source of the highside MOSFET in the first circuit; and
- the over-current protection circuit in the second controller includes a comparator to compare a reference voltage to a voltage at a source of the highside MOSFET in the second circuit.

8. The first controller and at least a second controller of claim 7, wherein:
- an output from the comparator in the over-current protection circuit in the first controller causes the first circuit to discontinue supplying the load with power if the voltage at the source of the highside MOSFET in the first circuit exceeds the reference voltage applied to the comparator in the over-current protection circuit in the first controller; and
- an output from the comparator in the over-current protection circuit in the second controller causes the second circuit to discontinue supplying the load with power if the voltage at the source of the highside MOSFET in the second circuit exceeds the reference voltage applied to the comparator in the over-current protection circuit in the second controller.

9. The first controller and at least a second controller of claim 8, wherein:
- the reference voltage applied to the comparator in the over-current protection circuit in the first controller is derived from a supply voltage supplied to a drain of the highside MOSFET in the first circuit, wherein the reference voltage applied to the comparator in the over-current protection circuit in the first controller is measured at a current sense pin on the first controller which is connected via a resistor to the supply voltage; and
- the reference voltage applied to the comparator in the over-current protection circuit in the second controller is derived from a supply voltage supplied to a drain of the highside MOSFET in the second circuit, wherein the reference voltage applied to the comparator in the over-current protection circuit in the second controller is measured at a current sense pin on the second controller which is connected via a resistor to the supply voltage.

10. The first controller and at least a second controller of claim 9, wherein:
- the over-voltage protection circuit in the first controller includes a comparator to compare a feedback signal to a reference signal; and
- the over-voltage protection circuit in the second controller includes a comparator to compare a feedback signal to a reference signal.

11. The first controller and at least a second controller of claim 10, wherein:
- an output from the comparator in the over-voltage protection circuit in the first controller causes the first circuit to discontinue supplying the load with power if the feedback voltage applied to the comparator in the over-voltage protection circuit in the first controller exceeds the reference signal applied to the comparator in the over-voltage protection circuit in the first controller; and
- an output from the comparator in the over-voltage protection circuit in the second controller causes the second circuit to discontinue supplying the load with power if the feedback voltage applied to the comparator in the over-voltage protection circuit in the second controller exceeds the reference signal applied to the comparator in the over-voltage protection circuit in the second controller.

12. The first controller and at least a second controller of claim 11, wherein:
- the feedback voltage applied to the comparator in the over-voltage protection circuit in the first controller is derived from a voltage at an output of the first circuit; and
- the feedback voltage applied to the comparator in the over-voltage protection circuit in the second controller is derived from a voltage at an output of the second circuit.

13. The first controller and at least a second controller of claim 12, wherein:
- the reference voltage applied to the comparator in the over-voltage protection circuit in the first controller is obtained from a voltage reference pin on the first controller which is increased by a preselected amount; and
- the reference voltage applied to the comparator in the over-voltage protection circuit in the second controller is obtained from a voltage reference pin on the second controller which is increased by the preselected amount.

14. The first controller and at least a second controller of claim 13, wherein:
- an output from the comparator in the over-voltage protection circuit in the first controller causes the first circuit to discontinue supplying the load with power if the feedback voltage applied to the comparator in the over-voltage protection circuit in the first controller exceeds the reference voltage applied to the comparator in the over-voltage protection circuit in the first controller; and
- an output from the comparator in the over-voltage protection circuit in the second controller causes the second circuit to discontinue supplying the load with power if the feedback voltage applied to the comparator in the over-voltage protection circuit in the second controller exceeds the reference voltage applied to the comparator in the over-voltage protection circuit in the second controller.

15. The first controller and at least a second controller of claim 14, further comprising a pulse width modulation line connecting the first controller to the second controller causing the first controller and the at least a second controller to have the same duty cycle.

16. The first controller and at least a second controller of claim 15, wherein:
- the first controller further comprises a pulse width modulator section with an output to a logic control section; and the second controller further comprises a pulse width modulator section with an output to a logic control section.

17. The first controller and at least a second controller of claim 16, wherein:

the logic control section in the first controller has an output to a gate of the highside MOSFET in the first circuit and an output to a gate of a lowside MOSFET in the first circuit; and the logic control section in the second controller has an output to a gate of the highside MOSFET in the second circuit and an output to a gate of a lowside MOSFET in the second circuit.

18. The first controller and at least a second controller of claim 17, wherein:

the logic control section in the first controller has an enable input from a fault comparator section in the first controller; and the logic control section in the second controller has an enable input from a fault comparator section in the second controller.

19. The first controller and at least a second controller of claim 18, wherein:

the pulse width modulation section in the first controller includes a comparator to compare an output from an error amplifier in the first controller with an output from the first oscillator; and the pulse width modulation section in the second controller includes a comparator to compare an output from an error amplifier in the second controller with an output from the second oscillator.

20. The first controller and at least a second controller of claim 19, wherein:

an output from the comparator in the pulse width modulation section in the first controller is input to an AND gate in the pulse width modulation section in the first controller; and an output from the comparator in the pulse width modulation section in the second controller is input to an AND gate in the pulse width modulation section in the second controller.

21. The first controller and at least a second controller of claim 20, wherein:

the AND gate in the pulse width modulation section in the first controller has an input from the fault comparator section in the first controller; and the AND gate in the pulse width modulation section in the second controller has an input from the fault comparator section in the second controller.

22. The first controller and at least a second controller of claim 21, wherein:

an output of the AND gate in the pulse width modulation section in the first controller controls the output from the pulse width modulator section in the first controller to the logic control section in the first controller; and an output of the AND gate in the pulse width modulation section in the second controller controls the output from the pulse width modulator section in the second controller to the logic control section in the second controller.

23. The first controller and at least a second controller of claim 22, wherein the pulse width modulation line is connected between the output of the AND gate in the pulse width modulation section in the first controller and the output of the AND gate in the pulse width modulation section in the second controller wherein the pulse width modulation line prevents a discontinuance of power to the first circuit by the first controller if there is no fault indicated by the first fault comparator section and wherein the pulse width modulation line prevents a discontinuance of power to the second circuit by the second controller if there is no fault indicated by the second fault comparator section.

24. The first controller and at least a second controller of claim 15, wherein:

the first controller further comprises a circuit to adjust the duty cycle when the at least a second controller is caused to discontinue supplying power to the load; and the at least a second controller further comprises a circuit to adjust the duty cycle when the first controller is caused to discontinue supplying power to the load.

* * * * *